United States Patent [19]
Beyda

[11] Patent Number: 6,002,944
[45] Date of Patent: Dec. 14, 1999

[54] VEHICULAR TELEPHONE AND METHOD INCLUDING AN IMPROVED USER INTERFACE

[75] Inventor: William J. Beyda, Cupertino, Calif.

[73] Assignee: Siemens Information and Communication Networks, Inc., Boca Raton, Fla.

[21] Appl. No.: 08/744,230

[22] Filed: Nov. 4, 1996

[51] Int. Cl.$^6$ .................................................. H04Q 7/32
[52] U.S. Cl. ........................ 455/554; 455/557; 455/567; 379/376
[58] Field of Search ................... 455/554, 556, 455/557, 566, 567; 379/373–376; 307/9.1; 348/8; 381/74, 86

[56] References Cited

U.S. PATENT DOCUMENTS

| | | | |
|---|---|---|---|
| 3,993,161 | 11/1976 | Shore | 181/135 |
| 4,496,943 | 1/1985 | Greenblatt | 379/93.17 |
| 4,521,021 | 6/1985 | Dixon | 273/148 B |
| 4,584,603 | 4/1986 | Harrison | 348/8 |
| 4,727,569 | 2/1988 | Kutrieb et al. | 455/558 |
| 4,774,514 | 9/1988 | Hildebrandt et al. | 340/971 |
| 4,866,515 | 9/1989 | Tagawa et al. | 348/8 |
| 4,913,487 | 4/1990 | Breckel et al. | 297/14 |
| 4,965,824 | 10/1990 | Hollowed et al. | 379/428 |
| 4,977,592 | 12/1990 | Hollowed et al. | 379/428 |
| 5,058,150 | 10/1991 | Kang et al. | 455/556 |
| 5,109,412 | 4/1992 | Hollowed et al. | 379/455 |
| 5,123,112 | 6/1992 | Choate | 455/524 |
| 5,128,993 | 7/1992 | Skowronski | 379/438 |
| 5,155,766 | 10/1992 | Skowronski | 379/438 |
| 5,243,640 | 9/1993 | Hadley et al. | 455/557 |
| 5,257,413 | 10/1993 | Warner et al. | 455/557 |
| 5,278,891 | 1/1994 | Bhagat et al. | 455/431 |
| 5,311,302 | 5/1994 | Berry et al. | 348/14 |
| 5,398,991 | 3/1995 | Smith et al. | 297/188.16 |
| 5,408,515 | 4/1995 | Bhagat et al. | 455/431 |
| 5,438,610 | 8/1995 | Bhagat et al. | 455/431 |
| 5,568,484 | 10/1996 | Margis | 370/452 |

FOREIGN PATENT DOCUMENTS 3216197  11/1983  Germany.

Primary Examiner—Andrew M. Dolinar

[57] ABSTRACT

A vehicular passenger telephone 37 according to the present invention includes an improved passenger call notification mechanism 154, 534 and user interface. A passenger telephone 37 is provided which includes a handset 506, a credit card reader 508 and a housing 507 for the handset 506 and credit card reader 508. In addition, either the handset 506 or the housing 507 includes a ringer or other call notification circuit 509. The passenger telephone 37 is operative in a first mode such that call notification is provided by the handset or housing ringer 509. The passenger telephone 37 is operative in a second mode such that the vehicle=s entertainment system 150 is employed to provide private call notification. In a first embodiment, call notification is provided via an audio headset 152. In a second embodiment, call notification is provided via a video display terminal 252.

23 Claims, 12 Drawing Sheets

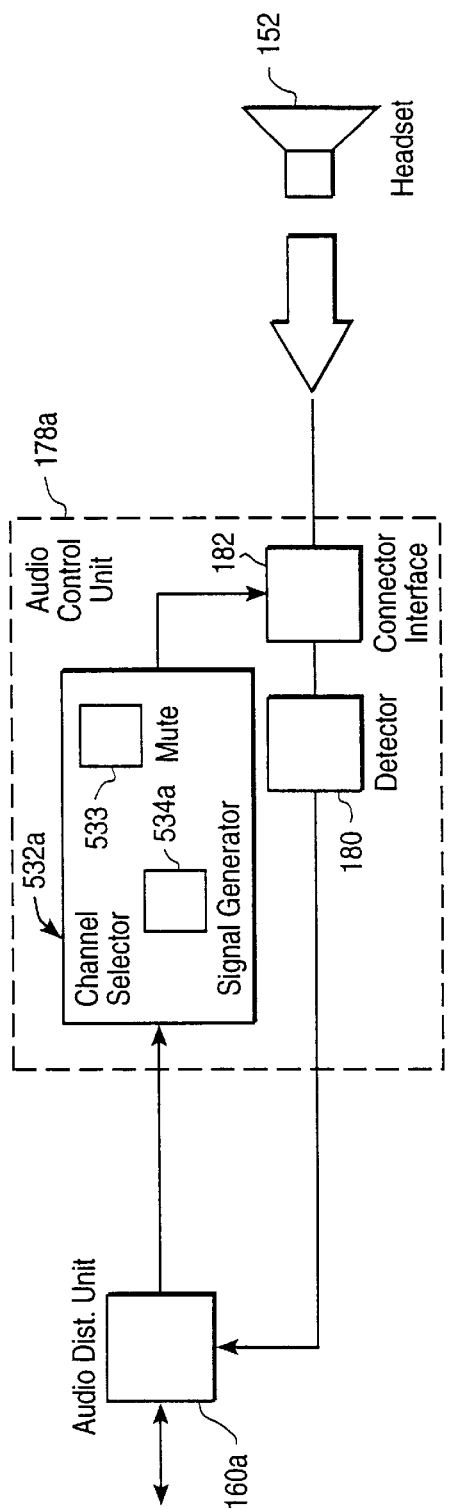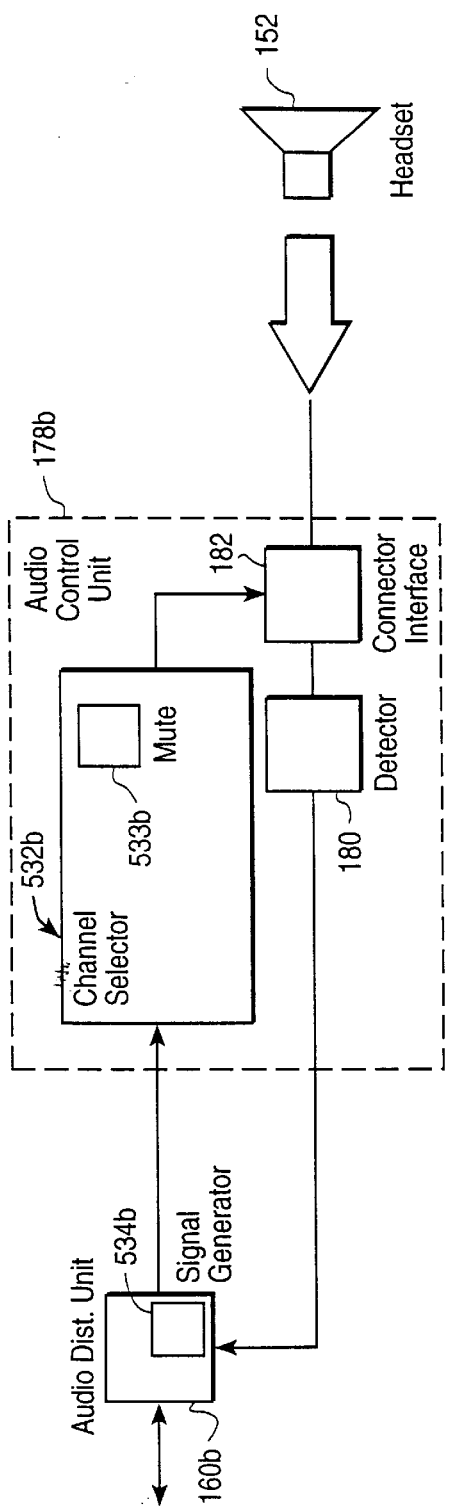

VEHICULAR TELEPHONE AND METHOD INCLUDING AN IMPROVED USER INTERFACE

BACKGROUND OF THE INVENTION

1. Field of the Invention

The present invention relates to vehicular telephones and, more particularly, to vehicular telephone for passenger use having an improved user interface.

2. Description of the Related Art

Credit card telephones for use by passengers in multi-passenger vehicles such as airplanes are well known. A credit card telephone is typically installed in the bulkhead or the seat back of the passenger seat in front of the user. The telephone includes a handset, a credit card reader, and a housing for the credit card reader and the handset. When the passenger or user inserts a credit card into the credit card reader, he or she may initiate a telephone call using the handset.

Until recently, while a passenger could initiate a telephone call using a telephone within the vehicle, the passenger was unable to receive a telephone call made by a party from outside the vehicle. In the case of an airplane, the passenger was unable to receive a call from a party not on the airplane. Recently, however, some airplanes include the capability of assigning a particular passenger a passenger identification code associated with the passenger=s seat location such that the passenger can be notified of an incoming telephone call. The passenger is notified through a call notification signal, and some type of calling party identification information is provided to the passenger on board the vehicle subsequent to call notification. Once the passenger has received notice of the telephone call, the passenger may insert his credit card into the credit card reader and return the phone call.

Such vehicular telephones which allow incoming calls, however, suffer from several drawbacks in their passenger notification and user interface features. Typically, the call notification mechanism is a ringer of some kind that emits an intrusive and attention-getting sound when an incoming call is received. While such ringers are adequate to notify the relevant passenger of an incoming call, they are disadvantageous in that they also disturb other passengers who may be disinterested in being notified of someone else=s incoming call. Accordingly, in order to avoid disturbing other passengers, carriers typically disable or turn down the volume of the ringers to a degree that the ringing will not disturb the other passengers. This, however, has the undesired effect of preventing the target passenger of being notified of the incoming call, because a low volume ring may be lost within the cabin background noise. Also, some passenger telephones are equipped with a small LED or LCD display screen to provide, for example, a caller identification function. While call notification on such a screen could be provided, such a visual cue is easily overlooked unless the passenger happens to be staring directly at the telephone or display, which is unlikely if, for example, the telephone is located in the seat=s armrest.

Therefore, an improved vehicular telephone apparatus and method is desired which provides an improved user interface. More particularly, an improved vehicular telephone apparatus and method is desired which reliably notifies a target passenger of an incoming call while not disturbing neighboring passengers.

SUMMARY OF THE INVENTION

A vehicular passenger telephone according to the present invention includes an improved passenger call notification mechanism and user interface. A passenger telephone is provided which includes a handset, a credit card reader, and a housing for the handset and credit card reader. In addition, either the handset or the housing includes a ringer or other call notification circuit. The passenger telephone is operative in a first mode such that call notification is provided via the handset or housing ringer. The passenger telephone is operative in a second mode such that the vehicle=s entertainment system is employed to provide private call notification via a passenger entertainment unit. In a first embodiment, call notification is provided via an audio headset. In a second embodiment, call notification is provided via a video display terminal.

A call notification system according to one embodiment of the present invention employs a call notification circuit using the passenger audio headset to provide an audio notification of an incoming call. When the audio headset is in use, incoming call notification is received over the headset either overlaid on an audio channel or with the currently playing audio channel muted. If the audio headset is not in use, incoming call notification is accomplished through another call notification circuit using the handset ringer mechanism. The audio headset may be either an acoustical headset or may be an electroacoustical headset that includes the speaker transducers.

A call notification mechanism in accordance with another embodiment of the present invention employs a passenger video system either as a complement or alternative to the ringer and audio headset call notification mechanisms described above. More particularly, the vehicle=s audio and video systems are configured to provide a video notification of an incoming message on the video screen provided in a passenger seatback, cabin bulkhead, or other location convenient to the user. In this embodiment, electronic mail notification capabilities may be provided.

BRIEF DESCRIPTION OF THE DRAWINGS

A better understanding of the present invention can be obtained when the following detailed description is considered in conjunction with the following drawings in which:

FIGS. 5A and 5B are more detailed block diagrams of embodiments of the call notification system of FIG. 4;

DETAILED DESCRIPTION OF THE INVENTION

Figure 1:
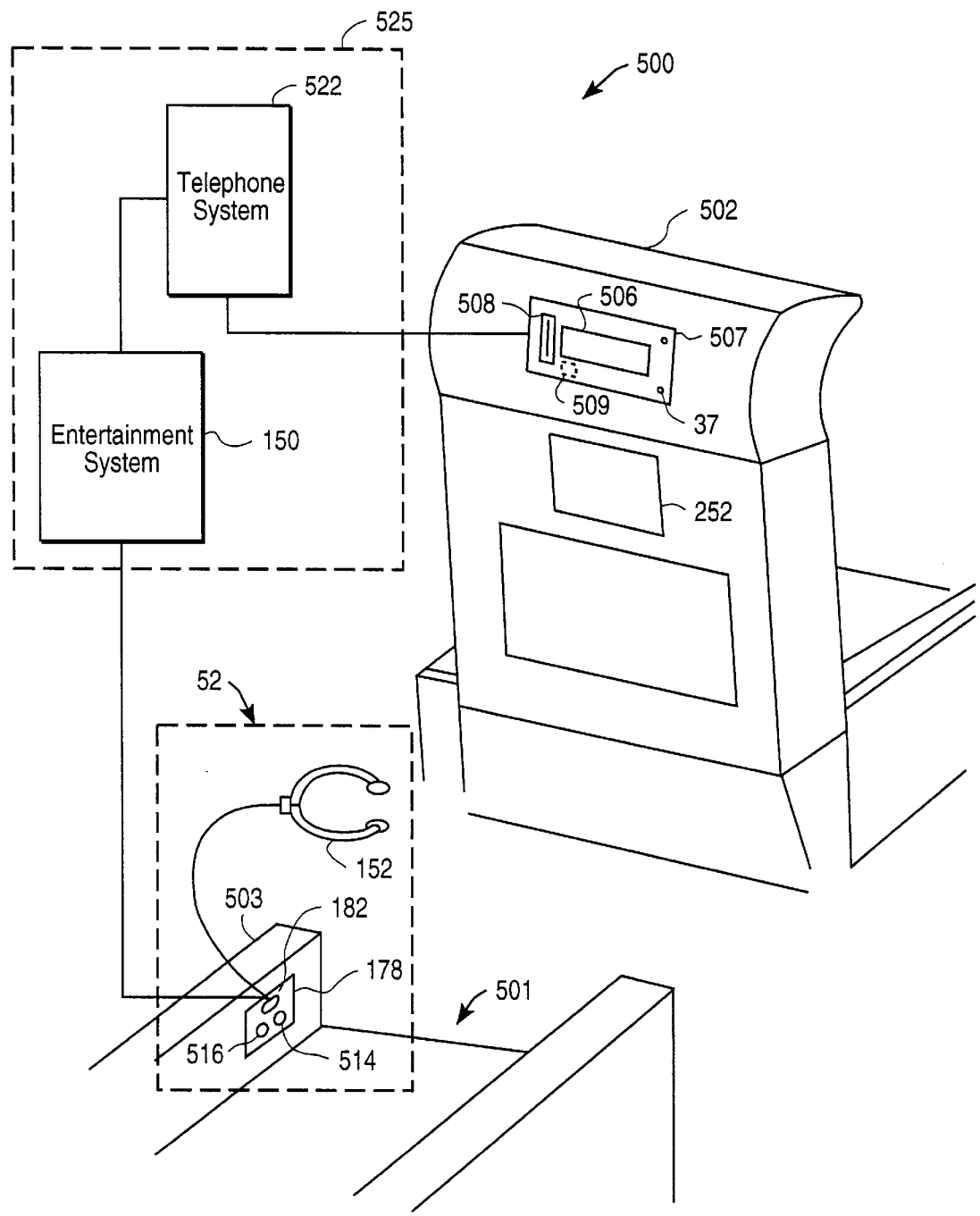
FIG. 1 is a diagram of a passenger interface and communications system according to one embodiment of the present invention.

FIG. 1—Passenger Interface

FIG. 1 illustrates a passenger interface 500 to a vehicular telecommunications system 525 in a multi-passenger vehicle. As shown, the vehicular telecommunications system 525 includes a telephone system 522 and an entertainment system 150 comprising, for example, an audio system. Telephone system 522 and entertainment system 150 are located at a convenient location within the multi-passenger vehicle. The passenger interface 500 is shown for a user or passenger seated in seat 501. It is understood that the passenger interface 500 is provided for a plurality or all of the seats in the multi-passenger vehicle and that the passenger interface 500 for one seat 501 is described here for simplicity.

The user=s seat 501 typically is provided behind another passenger=s seat 502. A telephone 37, including a credit card slot 508, a telephone handset 506, and a ringer or call notification circuit 509 is provided in a housing 507 incorporated into the seat back of passenger seat 502. A video monitor 252 may also optionally be provided in the seat back of passenger seat 502. It is noted that while video monitor 252 may be a cathode ray tube (CRT), for reasons of weight, it is preferably a liquid crystal display (LCD) or other flat screen device. It is further noted that when the user=s seat 501 is the first seat in a row and hence is not behind another seat, the telephone 37 and/or the video monitor 252 may be provided in a cabin bulkhead or other structure of the multi-passenger vehicle. In addition, the telephone 37 and/or the video monitor 252 may be provided within the arm rest 503 of user seat 501.

Telephone system 522 is coupled to provide signals to each telephone 37 in the multi-passenger vehicle, as will be discussed in greater detail below. Telephone system 522 is further coupled to entertainment system 150. In one embodiment, entertainment system 150 is a centralized audio system, which provides common audio signals to each seat; in another, entertainment system 150 is a distributed audio system which is configured to selectively provide different audio signals to an audio output unit 52 associated with each passenger seat. Audio output unit 52 includes an audio control unit 178, such as within arm rest 503. The audio system 150 is coupled to provide signals to the audio output unit 52 and, particularly, the audio control unit 178. The audio control unit 178 includes a headset connector 182, and such controls as a volume control 516 and a channel selector 514. Headset connector 182 is configured to receive an entertainment unit such as a headset 152, which may be either acoustic or electroacoustical, as will be described below.

Figure 2:
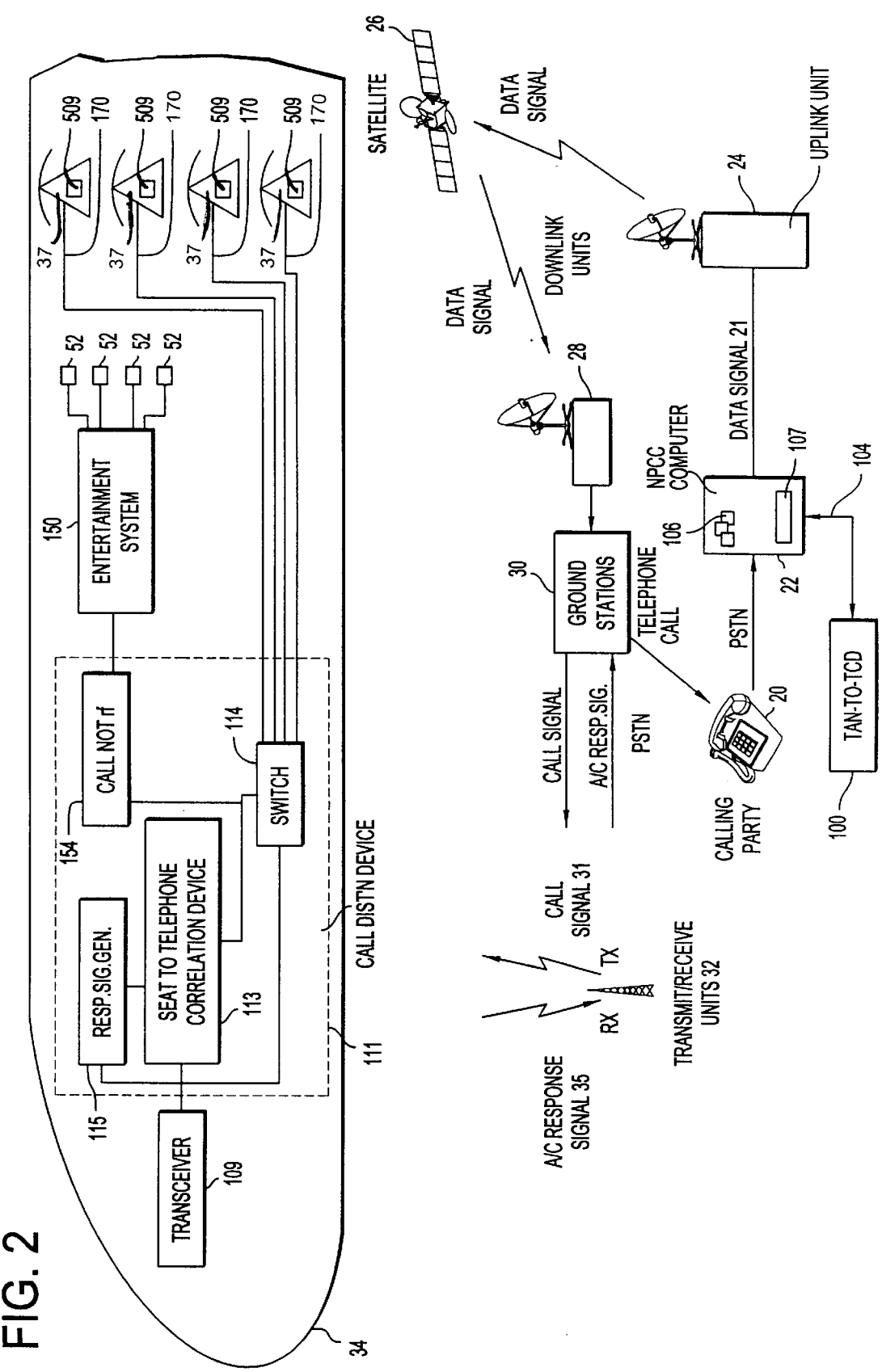
FIG. 2 is a block diagram illustrating a vehicular telephone system having a call notification system according to one embodiment of the present invention.

FIG. 2—Vehicle Communication System

Turning now to FIG. 2, an embodiment of a call notification system for a vehicular telecommunications system is shown according to the present invention. FIG. 2 illustrates the call notification system in an airplane 34. However, it is noted that the call notification system may be comprised in other types of multi-passenger vehicles, such as buses, railroad cars, etc. Thus, FIG. 2 is exemplary only.

FIG. 2 illustrates a communication system capable of directing a call to a particular telephone assigned to a passenger on the aircraft. For example, in one embodiment in which a telephone is provided for each seat on an airplane, a call to a passenger is routed directly to the telephone at the passenger's seat. The system of FIG. 2 includes a complete communication system, including a calling party telephone 20, a national paging control computer (NPCC) 22, an uplink unit 24, a satellite 26, a plurality of downlink units 28, a plurality of ground stations 30, a plurality of transmit/receive units 32, and an aircraft 34 having one or more airborne telephones 37 located thereon. It is noted that the vehicular telephone call notification system of the present invention may be used in conjunction with various types of communications systems, and the communications system as shown in FIG. 2 is exemplary only.

Calling party telephone 20 is coupled to the input of NPCC computer 22 via the public switched telephone network (PSTN). The output of NPCC computer 22 is coupled to provide data signal 21 to the input of uplink unit 24. Uplink unit 24, satellite 26, downlink units 28, ground stations 30, and transmit/receive units 32 form a signal transmitting and receiving network which covers any preselected geographic region. Data signal 21 is subsequently uplinked by uplink unit 24 to satellite 26 which transmits data signal 21 to downlink units 28. The output of each downlink unit 28 is coupled to an input of a corresponding ground station 30. Ground stations 30 receive data signals 21 from downlink units 28. An output of each ground station 30, i.e., a call signal 31, is coupled to an input of a corresponding transmit/receive unit 32. Each transmit/receive unit 32 subsequently transmits call signal 31 to possible aircraft locations. If the airborne telephone 37 on aircraft 34 receives a call signal from any transmit/receive unit 32, i.e., if the call signal is intended for a telephone 37 located on the aircraft 34, then an aircraft response 35 is formed and transmitted from the airborne telephone(s) or telephone system to the transmit/receive unit 32 from which the call signal was received. Aircraft response signal 35 is then passed from an output of transmit/receive unit 32 to an input of the corresponding ground station 30. Ground station 30 is coupled to the calling party over the PSTN.

Subscribers to the ground-to-air telephone service are assigned a unique traveler assigned number (TAN) by a service operator. The TAN may be, for example, the subscriber's social security number, frequent flyer number, or any code or similar identifier sufficient to uniquely identify that subscriber. Also, each aircraft participating in the service is assigned a unique aircraft identification number (AIN), which may comprise any code or identifier sufficient to uniquely identify that aircraft.

The embodiment of FIG. 2 further includes a TAN-to-telephone correlation device (TAN-to-TCD) 100. In this embodiment, TAN-to-TCD 100 is located at airline ticket counters of airports corresponding to geographic regions in which the airplane telephone service is offered. In other embodiments, the TAN-to-TCD 100 is located within the aircraft.

The telephones 37 may be distributed throughout the aircraft in any manner; for example, one telephone for each seat, one telephone for each row or block of seats, or one telephone at the front of the aircraft and one at the rear of the aircraft. In one embodiment, upon check-in at a ticket counter (not shown), an operator (not shown) enters into the TAN-to-TCD 100 the subscriber's TAN and seat assignment on the aircraft and the aircraft's AIN (Henceforth, the subscriber is referred to as a "passenger."). The ticket counter operator may also enter the times that the passenger is scheduled to be in the assigned seat (typically the scheduled flight time).

The TAN-to-TCD 100 forwards the foregoing information to the NPCC computer 22 via connection 104. The NPCC computer 22 builds a passenger record 106 for the passenger, which includes the passenger's TAN and seat assignment information and the aircraft's AIN, and administers the telephone service for the passenger during his or her flight. The NPCC computer 22 may also be configured to receive flight time update information, or a signal indicating the termination of the flight, since the scheduled flight time is not necessarily an accurate indication of actual flight time.

As noted above, in an alternative embodiment, the TAN-to-TCD functionality is performed on-board the aircraft. For example, the passenger may log into the system by inserting his credit card into the on-board telephone and enter his TAN. The record or the input information associating the user with the telephone (and the aircraft) is transmitted to a ground station, which provides it to the central NPCC. This embodiment obviates the need for a computer terminal and associated ticket counter operator in the airport.

Turning back to FIG. 2, the embodiment of FIG. 2 also includes a transceiver 109, a call distribution device 111, and a plurality of telephones 37 on the aircraft 34. Receiver/transmitter 109 on board aircraft 34 is capable of receiving RF call signal 31 and transmitting RF A/C response signal 35. Receiver/transmitter 109 preferably comprises a multi-channel digital RF receiver/transmitter in compliance with the 800 MHZ system mandated by the FCC.

Call distribution device 111 is connected to each telephone 37 on aircraft 34 via connections 120. Call distribution device 111 includes response signal generator 115, seat-to-telephone correlation device 113, switch 114, and call notification controller 154. Response signal generator 115 responds to the AIN in the received call signal 31 and generates A/C response signal 35 if the AIN corresponds to that aircraft. Seat-to-telephone correlation device 113 correlates each seat on the aircraft with a particular telephone on the aircraft. For example, if each seat on the aircraft is equipped with a telephone, there is a one-to-one correspondence between the seats and telephones. If, however, there is one telephone for a plurality of seats, for example, one row of three seats, seat-to-telephone correlation device 113 correlates those three seats to a particular telephone 37, which may be conveniently located with respect to all three seats. Switch 114 establishes a connection between the caller and the corresponding telephone 37. Call notification controller 154 is coupled to selectively provide a call notification command to each telephone 37, activating, for example, ringer 509 when an incoming call is received.

The embodiment of FIG. 2 further includes an entertainment or audio system 150 which is coupled to a plurality of audio output units 52. Audio output units 52 comprise, for example, a headset and associated connectors and audio control units (not shown). Entertainment system 150 is further coupled to call notification controller 154. Audio output units 52 are coupled to detect whether or not a particular headset is installed in its corresponding connector. This may be accomplished via a switch or current detector or any of a variety of detectors employing, for example, analog and/or digital circuitry, programmable microcontrollers, and the like. According to the present invention, if the headset of a respective user or passenger is installed and an incoming call for the respective user or passenger is received, the ringer or call notification circuit 509 of the telephone 37 associated with the respective user or passenger is inhibited from ringing or providing call notification, and instead the notification is received over the headset, as will be explained in more detail below. It is noted that audio system 150 need not be a centralized system; it may, for example, be a distributed audio system.

Figure 3A:
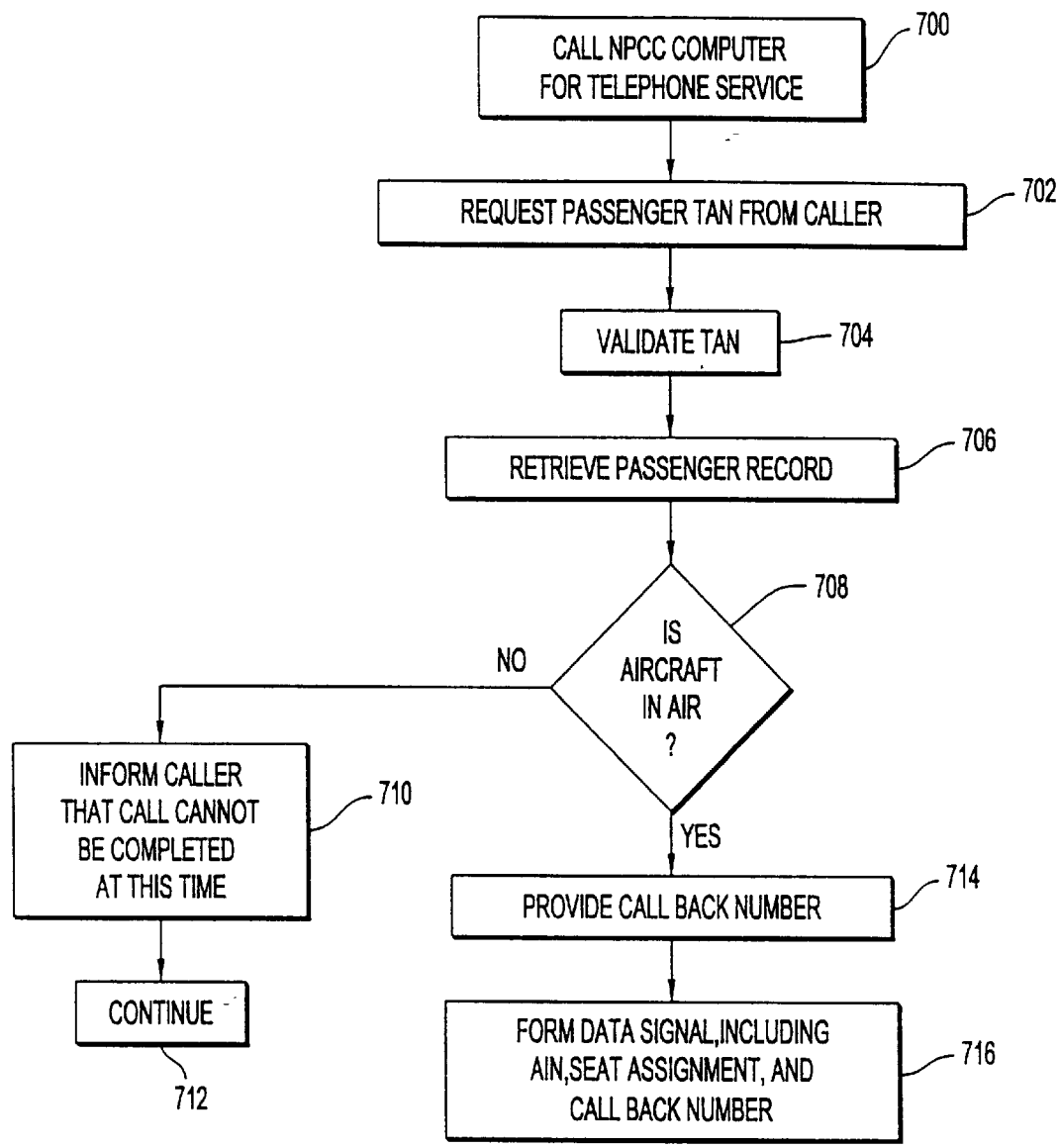
FIGS. 3A, 3B, and 3C are flow charts of the operation of the vehicular telephone system with call notification of FIG. 2.

FIG. 3A—Call Formulation and Reception

FIG. 3A is a flow diagram illustrating the operation of the system to formulate a telephone call. It is noted that various types of call operations may be employed, as desired. As shown in FIG. 3A, calling party 20 initiates a call to the passenger by calling the NPCC computer 22 via the public switched telephone network (PSTN) (step 700). A voice prompt device 107 within the NPCC computer 22 prompts the calling party 20 to input the passenger's TAN (step 702). The calling party then inputs, via telephone 20, the TAN number of the airborne telephone. The NPCC computer may then validate the TAN (step 704). The NPCC computer 22 then retrieves the passenger record 106 corresponding to the TAN (step 706). The NPCC computer 22 then determines whether or not the aircraft is in the air (step 708). If the caller has called during a time outside the actual or scheduled flight time of the passenger, the NPCC computer 22 informs the caller that the call cannot be completed at this time, or provides some other appropriate message (step 710), and continues with normal processing. If, instead, the caller has called during the passenger's flight time, the caller=s callback number is provided, either through standard caller-identification methods or in response to a request by the NPCC computer 22 that the caller input a callback number (step 714). After the callback number is received by the NPCC computer, the calling party 20 hangs up and awaits a return call. The NPCC computer 22 then formulates a data signal 21 from the AIN, passenger seat assignment information and the callback number (step 716). Further details concerning data signal formulation may be obtained from Bhagat et al., U.S. Pat. No. 5,438,610, issued Aug. 1, 1995, which is hereby incorporated by reference in its entirety as though fully and completely set forth herein.

Figure 3B:
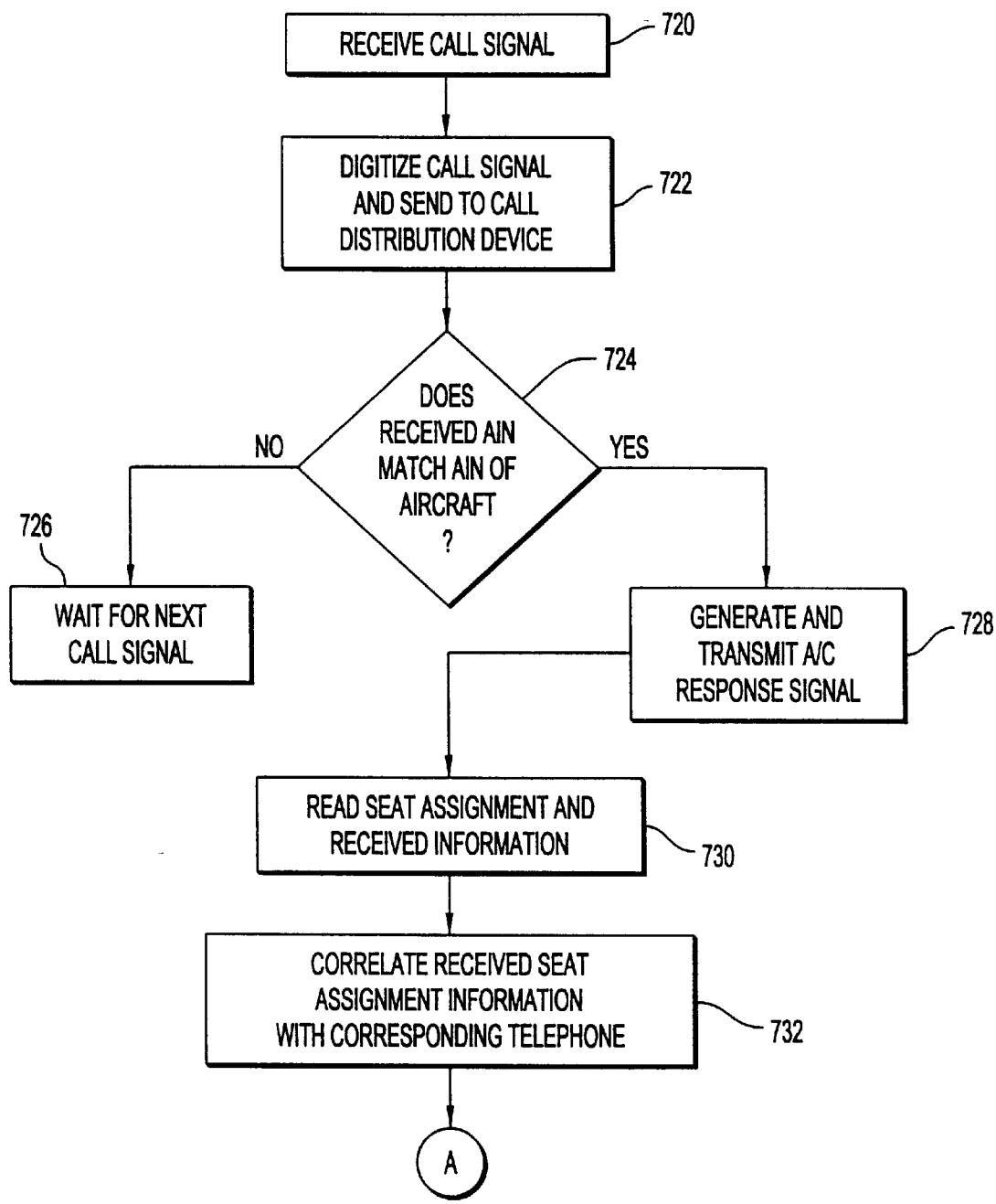
Figure 3C:
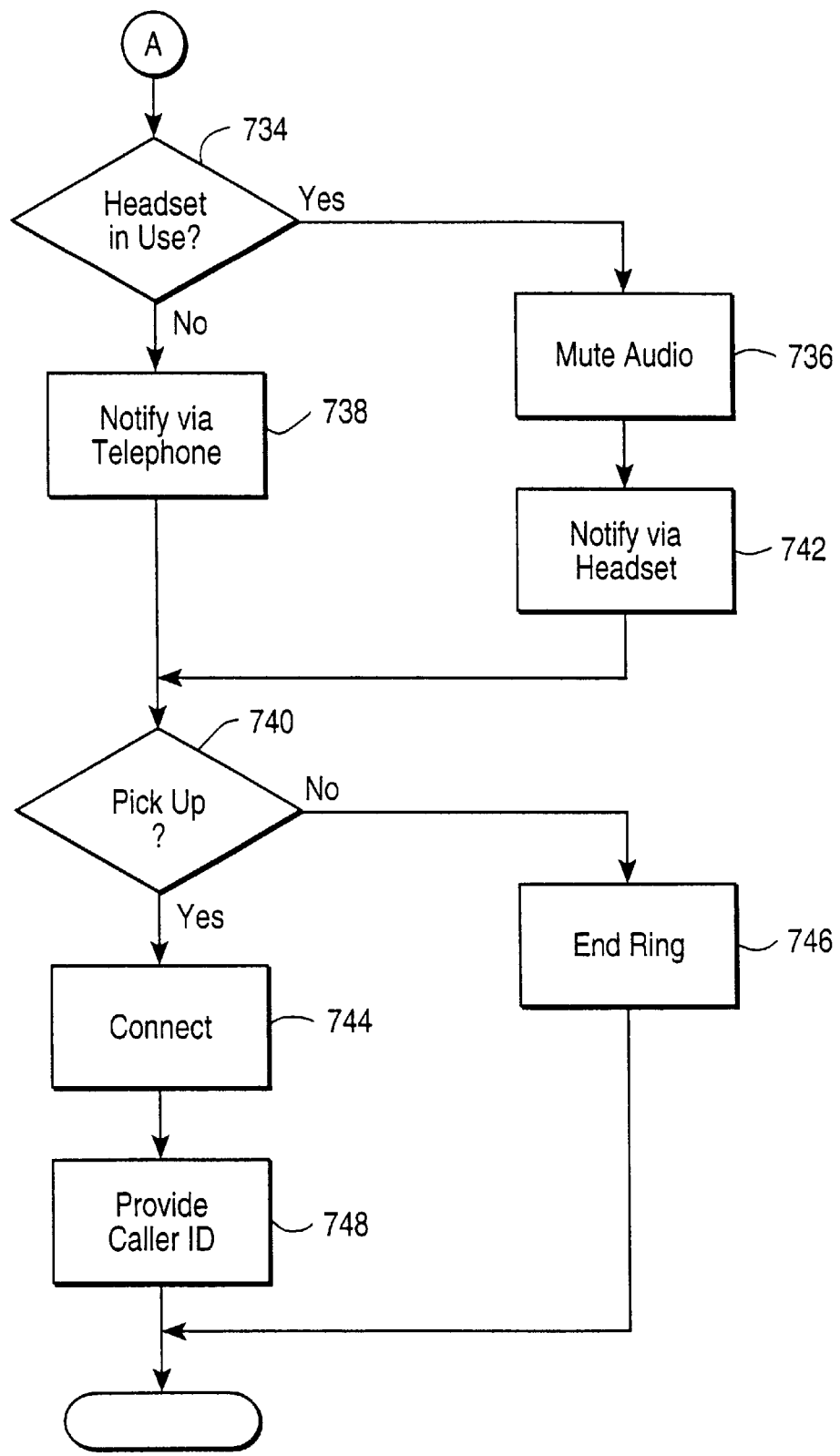

FIG. 3B and 3C—Call Reception and Notification

FIGS. 3B and 3C illustrate the operation of transceiver 109, call distribution device 111 for receiving and distributing calls to a passenger, and call notification controller 154. Call signal 31 is received by transceiver 109 (step 720), which digitizes the received RF signal and transfers the digitized call signal to response signal generator 115 of call distribution device 111 (step 722). Response signal generator 115 reads the AIN and determines whether the received AIN matches that of the aircraft (step 724). If the received AIN does not match the AIN of the aircraft, the call is not intended for a passenger on the aircraft; hence, the call distribution device 111 does not respond, but instead, awaits another call signal 31 (step 726). If, however, the received AIN matches the AIN of the aircraft, response signal generator 115 generates A/C response signal 35, which transceiver 109 transmits back to the appropriate transmit/receive unit 32 (step 728), as described above with respect to FIG. 2.

Seat-to-telephone correlation device 113 of call distribution device 111 then reads the seat assignment, for example, from the digital information of the received call signal 31 (step 730), identifies which telephone 37 in the aircraft corresponds to that seat assignment (step 732), and notifies switch 114 of the telephone to be called. If the headset or audio system of the seat corresponding to the telephone is identified by a detector associated with the audio output units to be inactive or not coupled within the system (step 734), a call notification signal is provided to a call notification circuit, such as a ringer 509, that generates an audible call notification on signal, within the corresponding telephone to alert the passenger to the call (step 738). A call connection is established when the passenger picks up the phone (steps 740 & 744). If, in step 734, the headset is identified to be active, or coupled within the system, the call notification signal is sent via another call notification circuit associated with the audio system. This call notification circuit or associated call notification control circuitry may mute the audio (step 736), and provide the call notification signal as an audible tone via the headset (step 742). It is noted that the audio signal need not necessarily be muted, but the call notification signal may be superimposed upon it. If the user picks up the telephone (step 740), the call will be connected (step 744) and the appropriate caller identification will be provided (step 748). If, in step 740, the user did not pick up the telephone, the call identification would cease after a certain predetermined period of time (step 746) and the system would thereafter de activate. The telephone connection is established when ground station 30 responds to the A/C response signal 35 by calling the queued call-back number of the caller and the caller answers the return call.

Figure 4:
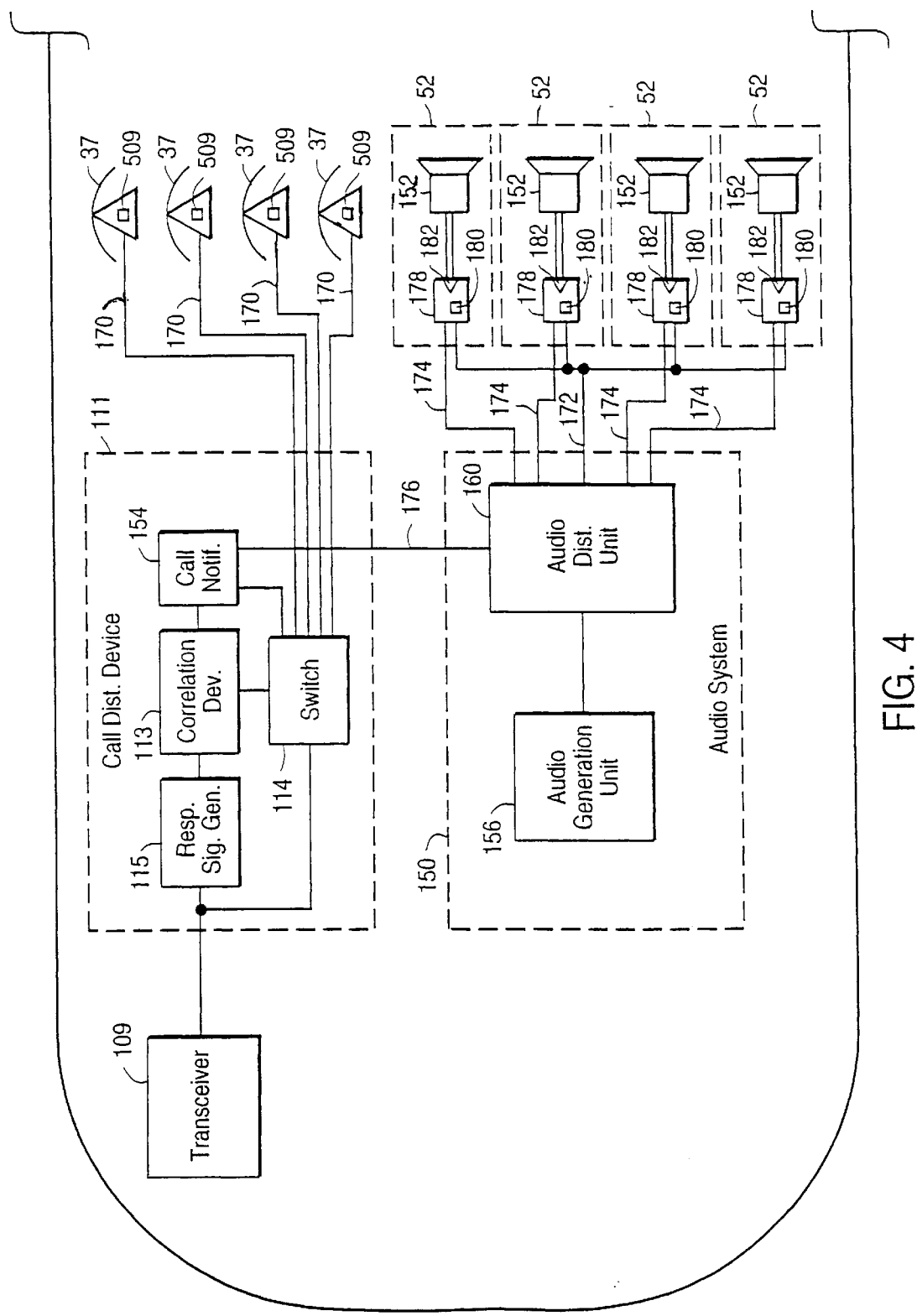
FIG. 4 is a block diagram of a vehicular telephone system having a call notification system according to one embodiment of the present invention.

FIG. 4—Call Notification System

Turning now to FIG. 4, a call notification system according to one embodiment of the invention is illustrated. Numerical references for components corresponding to those in FIGS. 1 and 2 remain the same. Audio entertainment system 150 includes an audio generation unit 156 coupled to an audio distribution unit 160. Audio generation unit 156 may comprise, for example, a multi-channel audio tape deck.

Audio distribution unit 160 provides audio signals via one or more audio lines 172 to audio control units 178. Audio control units 178 can include, for example, volume and channel selectors (not shown) as well as a headset connector or connector interface 182 for receiving a headset 152. In addition, each audio control unit 178 includes a detector or detection unit 180 for detecting whether or not the headset is coupled within connector 182. Detection unit 180 includes, for example, a switch or a current detection mechanism for determining whether the headset is installed. Other types of detectors, including any combination of analog and digital circuitry, or programmable microcontrollers, for example, are contemplated. It is noted that headset 152 may comprise an acoustical headset in which a transducer is provided within audio control unit 178 or at audio distribution unit 160. Headset 152 may also comprise a headset having built-in transducers. In the embodiment in which headset 152 is an acoustical headset, connector 182 activates a switch 180 which provides a signal to audio distribution unit 160 via signal line 174. In the embodiment in which headsets 152 are electroacoustical headsets, detection units 180 comprise current detection units which determine whether or not current is flowing through the headset connectors 182. If current is present, detection units 180 send a signal to audio distribution unit 160.

Audio distribution unit 160 provides a signal to call notification controller 154 via line 176 indicating whether the headset 152 is plugged in. If an incoming call is received, and if the headset 152 is determined to be plugged in, call notification controller 154 disables the ringer or call notification circuit 509 on telephones 37. Audio distribution unit 160 then either generates the call notification signal over the headset 152 or transmits a signal to the audio control units 178, which in turn generate the call notification signal over headset 152. Therefore, when the respective headset 152 is plugged in and an incoming call is received for the respective user, the respective detection unit 180 detects that the headset 152 is plugged in and causes the call notification signal to be provided, for example, as an audible tone, over headset 152, instead of ringing the telephone ringer.

FIGS. 5A and 5B—Audio Control Units

FIGS. 5A and 5B are more detailed block diagrams illustrating the audio control unit 178. More particularly, turning now to FIG. 5A, a more detailed block diagram is shown of the audio control unit 178a in the call notification system of FIG. 4. As shown, audio control unit 178a comprises channel selector 532a having a mute controller 533 and a signal generator 534a. Also incorporated within audio control unit 178a is a connection interface 182 for receiving headset 152, and a detector 180 for determining whether a headset is coupled to connector interface 182. Channel selector 532a is coupled to receive audio signals from audio distribution unit 160a. Signal generator or call notification unit 534a is configured to generate an audible tone on the channel currently selected over headset 152. When headset 152 is electrically or acoustically coupled to connector interface 182, detector 180 detects its presence and transmits a signal to audio distribution unit 160a or to call distribution device 111 (not shown). If the signal is provided to audio distribution unit 160a, audio distribution unit 160a, in turn, provides a signal to call notification controller 154 (not shown). If a call is received, the ringer of the telephone 37 is blocked and signal generator or call notification unit 534a generates the tone that provides call notification over headset 152. It is to be noted that channel selector 532a may also include an audio mute unit 533. Audio mute unit 533 either mutes the incoming audio signal, or switches it off, thereby permitting the call notification signal from signal generator 534a to be heard over headset 152.

The audio control unit illustrated in FIG. 5B is similar except that signal generator or call notification unit 534b is provided within audio distribution unit 160b. When detector 180 detects that headset 152 is installed in connector interface 182, detector 180 sends a signal either to audio distribution unit 160b or call distribution device 111 (not shown). If a call is received, audio distribution unit 160b receives a call signal from call notification controller 154 (not shown). Signal generator 534b then generates a call notification signal and provides it to channel selector 532b. When channel selector 532b receives the call notification signal, it either provides it immediately to headset 152 or it mutes the audio signal prior to providing the call notification signal.

Figure 6:
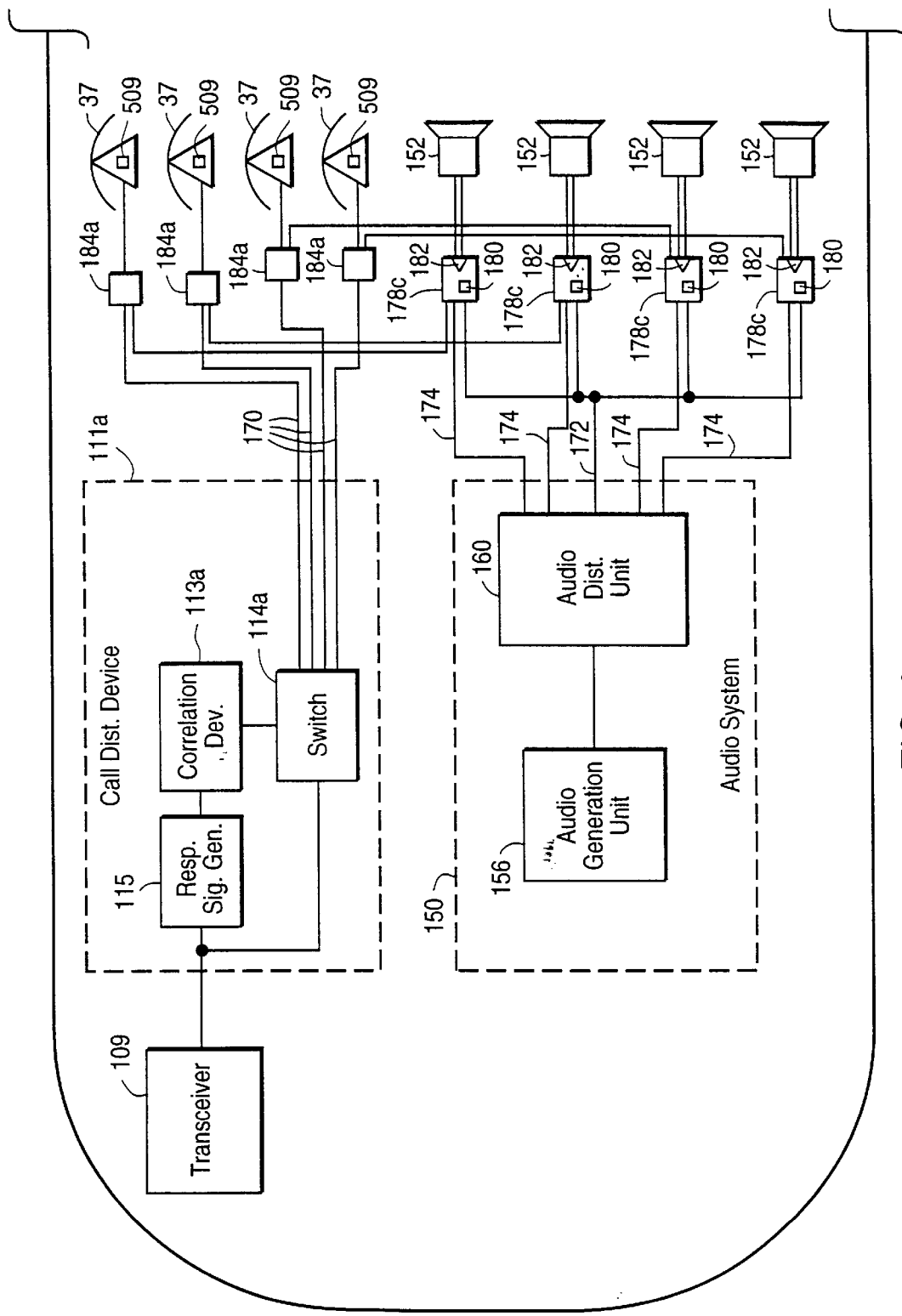
FIG. 6 is a block diagram of a vehicular telephone system having a call notification system according to another embodiment of the present invention.

FIG. 6—Call Notification System With Distributed Call Notification Controllers

Turning now to FIG. 6, an alternate embodiment of a call notification system according to the present invention is shown. The call notification system of FIG. 6 is similar to that illustrated in FIG. 4, except that the telephone call notification controllers are distributed. Components which are common to the embodiments illustrated in FIGS. 2 and 4 retain the same reference numerals. The embodiment of FIG. 6 includes a plurality of distributed call notification controllers 184a. Each of the distributed call notification controllers 184a is coupled to a respective telephone 37. Distributed call notification controllers 184a are coupled to audio control units 178c corresponding to the appropriate seat position. The distributed call notification controllers 184a operate to receive call notification control signals and provide call notification. The embodiment of FIG. 6 operates in a manner similar to that described with respect to the embodiment of FIG. 4. Detection circuit 180 of audio control unit 178c detects whether or not headsets 152 are coupled to connector interfaces 182. Detection unit 180 sends a corresponding signal to the corresponding call notification controller 184a. If the headset is coupled to connector 182, call notification controller 184a disables the telephone ringer or call notification circuit 509. Audio control unit 178c then provides the corresponding call notification signal via headset 152. Alternatively, audio distribution unit 160 may provide the call notification signal along lines 174 which in turn are transmitted via audio control unit 178c to the headsets 152.

Figure 7:
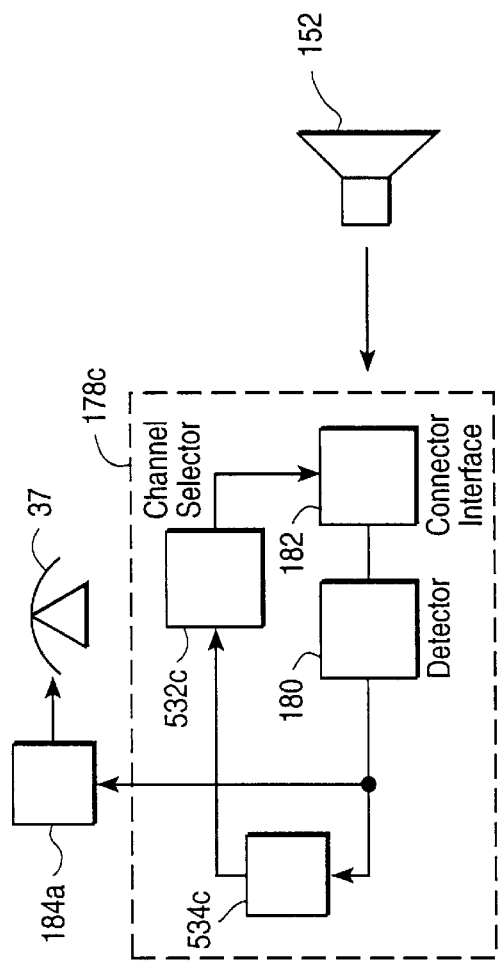
FIG. 7 is a more detailed block diagram of the call notification system of FIG. 6.

FIG. 7—Audio Control Unit for Call Notification System of FIG. 6

Turning now to FIG. 7, a block diagram of an audio control unit 178c of the call notification system of FIG. 6 is shown. The audio control unit 178c includes a detector 180 coupled to a connector interface 182 which receives headset 152. In addition, a channel selector 532c and a call notification unit 534c are provided. If headset 152 is installed, detector 180 transmits a signal to call notification controller 184a of telephone 37. If a telephone call is received, call notification controller 184a blocks the ringer 509 of telephone 37. The call notification signal is then provided by call notification unit 534c over headsets 152.

Figure 8:
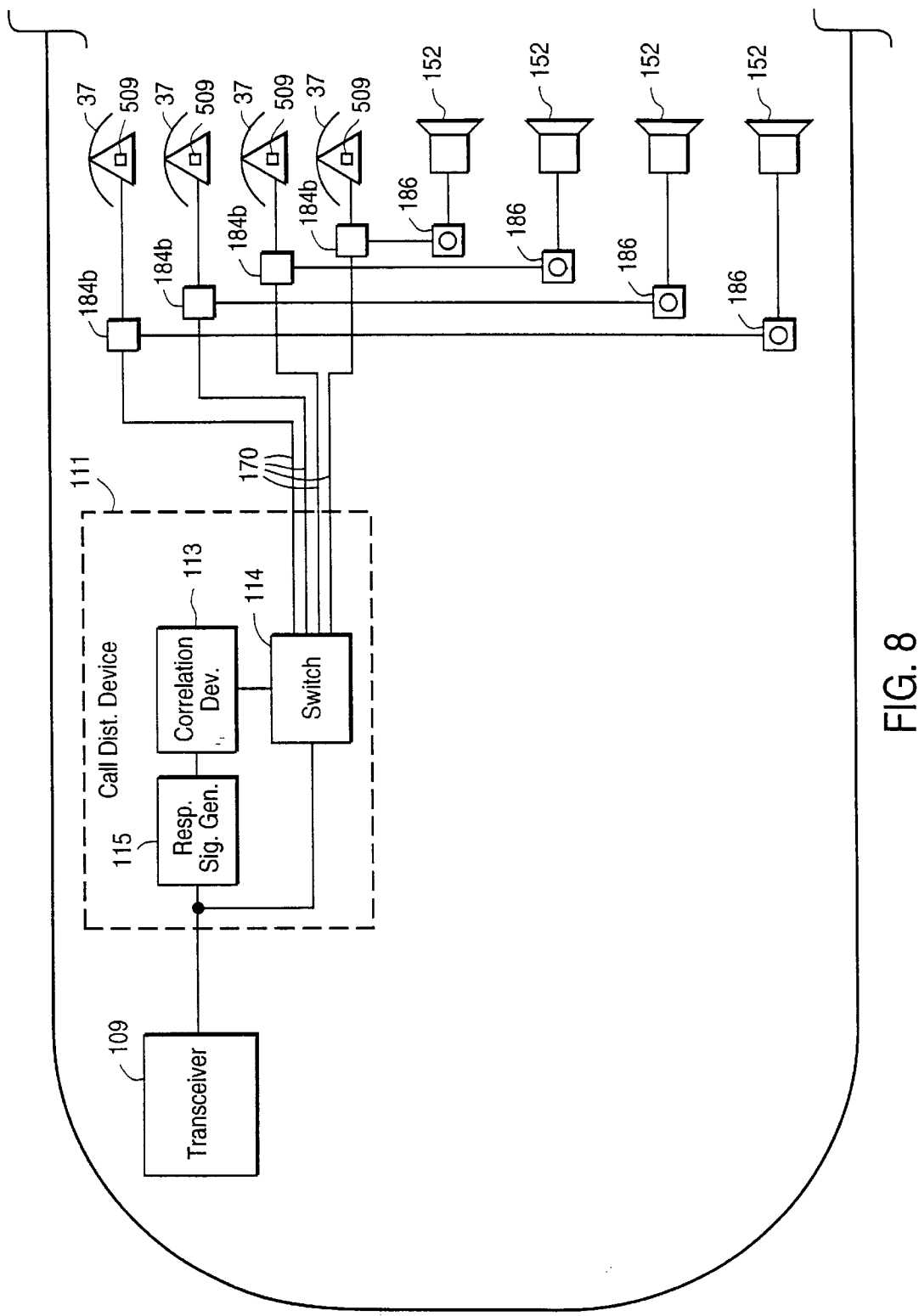
FIG. 8 is a block diagram of a vehicular telephone system having a call notification system according to another embodiment of the present invention.

FIG. 8—Call Notification System Having Distributed Audio System

FIG. 8 is a block diagram of a call notification system for a vehicular telecommunications system that is similar to the one shown in FIG. 6, but including a distributed audio system 186. Each distributed audio unit 186 is associated with a particular headset 152. Distributed audio units 186 comprise, for example, cassette players, CD players, and the like. Each distributed audio unit 186 further includes a signal generator (not shown) used to generate a call notification signal over headsets 152.

Figure 9:
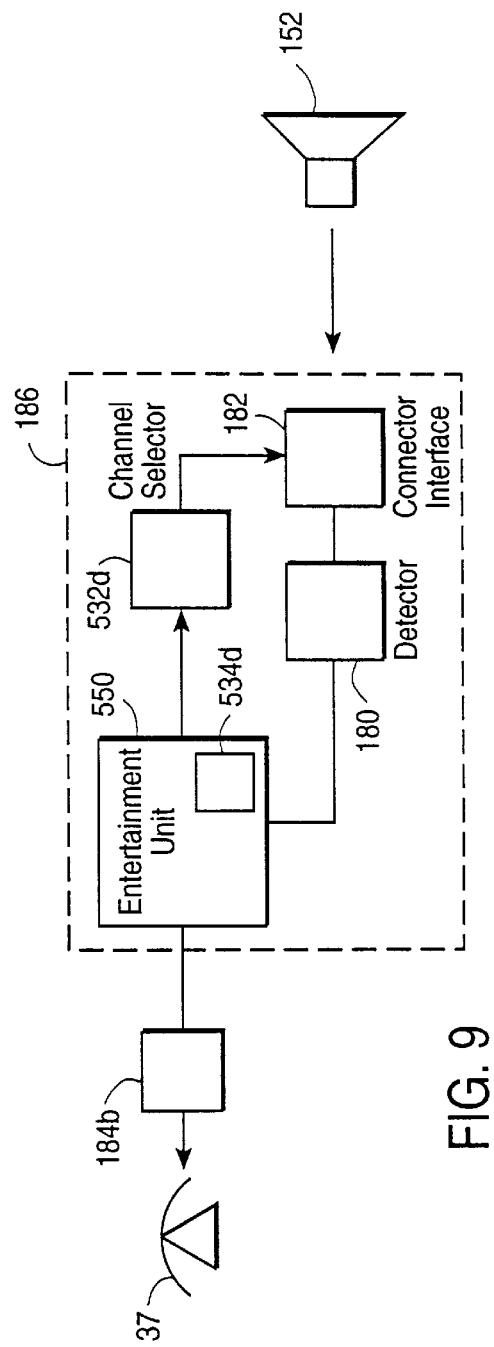
FIG. 9 is a more detailed block diagram of the call notification system of FIG. 8.

FIG. 9—Distributed Audio knit

FIG. 9 is a block diagram of the distributed audio unit 186 of the call notification system of FIG. 8. A connector interface 182 is coupled to receive the headset 152. A detector 180 is coupled to detect whether or not the headset is installed. In addition, an audio or entertainment unit 550 is provided which generates the desired audio signal and comprises various audio functional units. Either detector 180 or audio unit 550 provides a signal to call notification controllers 184b when headset 152 is installed in connection interface 182. Audio unit 550 then provides a call notification signal from call notification unit or circuit 534b over headset 152 if a call is received.

Figure 10A:
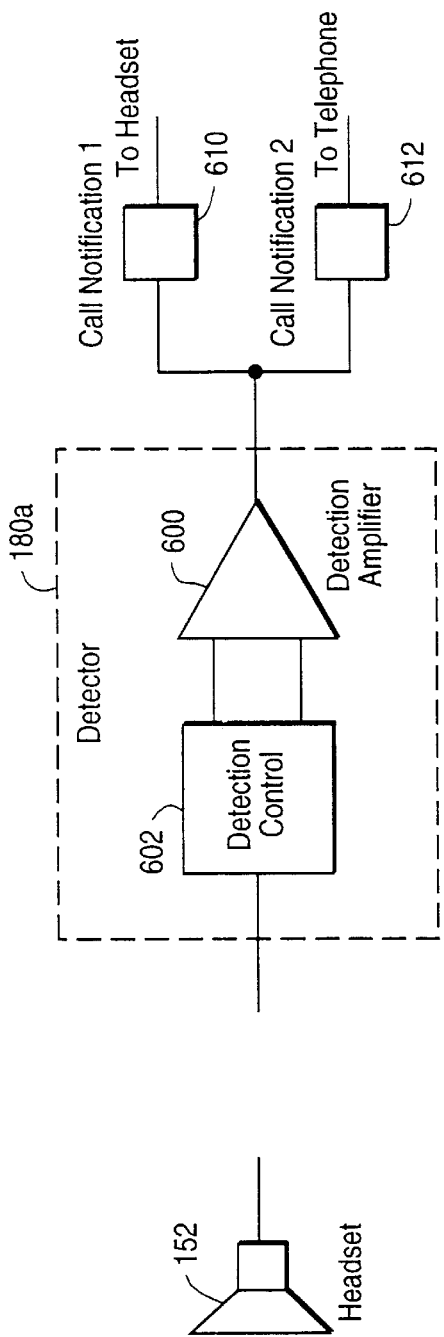
FIGS. 10A and 10B are more detailed block diagrams of headset detection mechanisms according to the present invention.
Figure 10B:
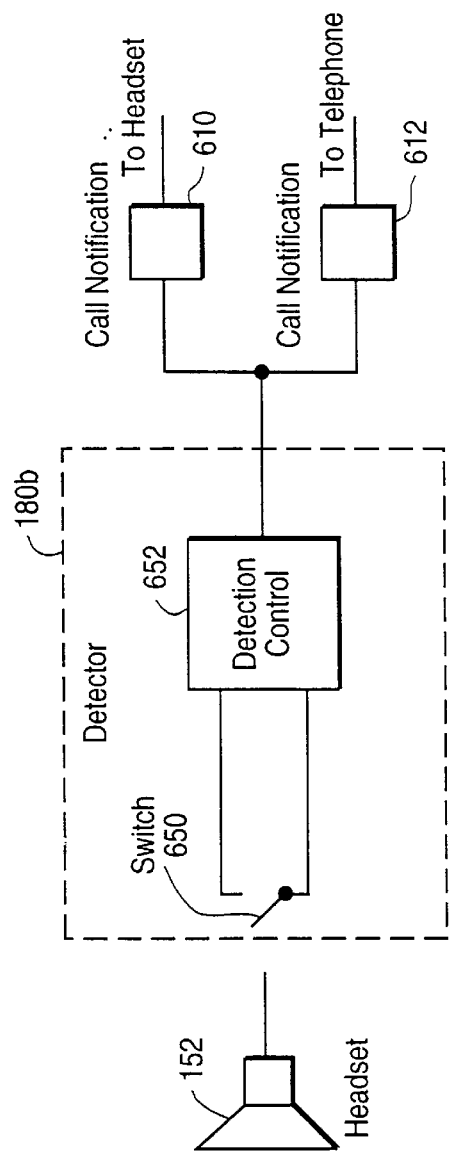

FIGS. 10A and 10B—Headset Detection Circuits

FIGS. 10A and 10B illustrate embodiments of the headset detection circuits 180a and 180b according to two embodiments of the present invention. Turning now to FIG. 10A, there is shown a headset detection circuit 180a employing a current monitor in order to determine whether or not an electroacoustical headset is installed. Detector 180a includes a detection amplifier 600, which may be an operational amplifier, coupled to detection control circuitry 602. When the headset 152 is installed in the connector interface (not shown), and audio signals are provided to the headset, detector 180a detects the current that is being provided. The output of detection amplifier 600 is a voltage whose level is responsive to the level of current. The output of detection amplifier 600 is coupled to call notification devices 610 and 612. Call notification device 610 comprises, for example, call notification circuit 534; call notification device 612 comprises, for example, call notification circuit 509. The output of call notification device 610 is provided to headset 152 and the output of call notification device 612 is provided to a telephone (not shown). Call notification device 610 may be configured, for example, to provide call notification via the headset when the level of voltage at the output of detection amplifier 600 exceeds a predetermined threshold. Similarly, call notification device 612 may be configured to provide call notification to the telephone when the output voltage of detection amplifier 600 is less than a predetermined threshold.

FIG. 10B illustrates an alternate embodiment of a headset detection circuit. Detector circuit 180b includes a detection control circuit 652, coupled to a switch 650. When headset 152 is installed in a connector interface (not shown), it will activate switch 650, which in turn will produce a signal via detection control circuit 652 which will be received by call notification devices 610 and 612. The output of call notification device 610 is provided to the headset and the output of call notification device 612 is provided to the telephone.

Figure 11:
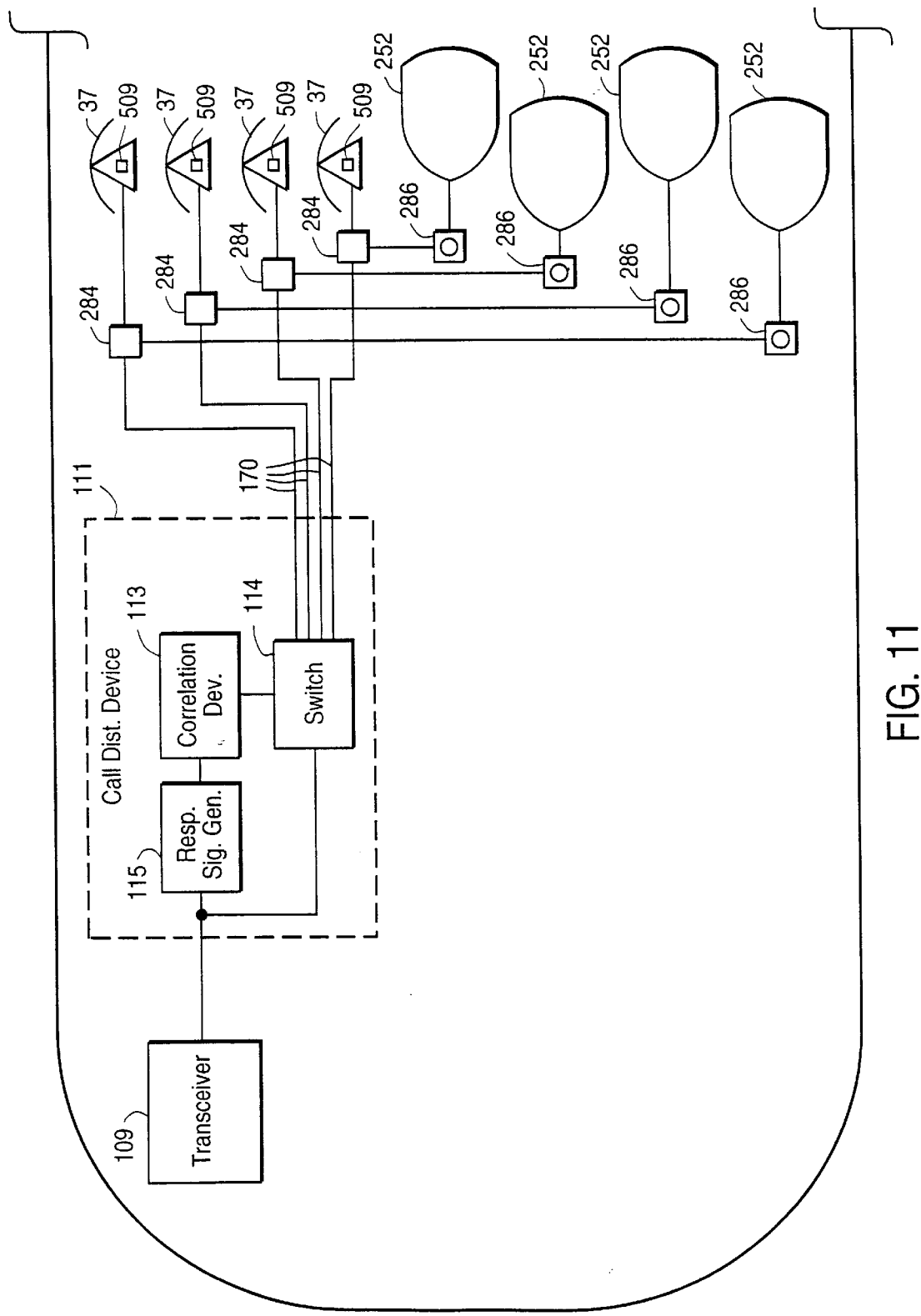
FIG. 11 is a block diagram of a vehicular telephone system having a video call notification system according to another embodiment of the present invention.

FIG. 11—Call Notification System with Video Notification

Turning now to FIG. 11, there is shown a block diagram of a call notification system for an entertainment system which employs entertainment units comprising video displays to provide call notification. The call notification system according to FIG. 11 includes video displays 252, video control units 286 and call notification controllers 284 coupled to telephones 37. When an incoming call is received, call notification controllers 284 route the call notification signal to video units 286, which in turn cause the call notification to be displayed on displays 252. It is to be noted that call notification on displays 252 may be provided either in addition to call notification by a ringer or in place of call notification by a ringer. Similarly, call notification on displays 252 may be provided either in addition to call notification by the headset mechanism described above or in place of call notification by the headset mechanism described above. Furthermore, it is noted that video displays 252 may be configured to provide notification and display of e-mail.

The invention described in the above detailed description is not intended to be limited to the specific form set forth herein, but on the contrary, it is intended to cover such alternatives, modifications, and equivalents as can reasonably be included within the spirit and scope of the invention as defined by the appended claims. Such alternatives may include, for example, the case in which one telephone is provided for several seats. In such cases, private call notification may still provided via headsets or video displays. Other alternatives include embodiments in which both video notification and audio notification of incoming calls are provided.

I claim:

1. A vehicular telecommunications system, comprising:
    a telephone comprised in a vehicle, and adapted for use by a passenger, wherein said telephone includes a first call notification circuit and said telephone is adapted to receive telephone calls from sources external to the vehicle in which said telephone is installed; and
    an audio system operably coupled to said telephone, said audio system comprising:
        a headset connector positioned near the passenger and adapted to receive audio signals;
        a headset adapted to be coupled to said headset connector and provide said audio signals to the passenger; and
        a second call notification circuit;
    wherein said vehicular telecommunications system is configured to provide call notification via said first call notification circuit in a first mode of operation in which said headset is not coupled to said headset connector and via said second call notification circuit in a second mode of operation in which said headset is coupled to said headset connector.

2. The vehicular telecommunications system of claim 1, wherein said audio system further comprises a detector configured to detect whether said headset is coupled to said headset connector.

3. The vehicular telecommunications system of claim 2, wherein said mechanism comprises a switch.

4. The vehicular telecommunications system of claim 2, wherein said mechanism comprises a current detector.

5. A method for providing call notification in a vehicular telecommunication system including an entertainment system and a telephone system, comprising:

receiving an incoming telephone call wherein the incoming telephone call is intended for one of a plurality of telephones;

identifying which one of the plurality of telephones is to receive said incoming telephone call;

determining whether an entertainment unit corresponding to said one of the plurality of telephones is active; and providing notification of said incoming telephone call via said entertainment unit if said entertainment unit is active.

6. The method of claim 5, wherein said determining comprises determining whether an audio headset is active.

7. The method of claim 6, wherein said determining comprises activating a switch and transmitting a signal responsive thereto.

8. The method of claim 6, wherein said determining comprises determining whether current is flowing through an audio interface.

9. The method of claim 5, wherein said providing includes disabling a ringer on said telephone.

10. The method of claim 5, wherein said providing includes providing a visual call notification on a video display unit.

11. The method of claim 5, wherein said entertainment unit comprises a headset and said providing includes providing an audible call notification via said headset if said entertainment unit is active.

12. The method of claim 11, wherein said providing includes muting an audio signal on said headset prior to providing said audible call notification.

13. A vehicular telecommunications system, comprising:

a telephone, including a first call notification circuit, said telephone adapted to receive telephone calls from sources external to a vehicle in which said telephone is installed; and an entertainment system operably coupled to said telephone having a second call notification circuit, wherein said vehicular telecommunications system is configured to provide call notification via said first call notification circuit in a first mode of operation in which said entertainment system is not active and via said second call notification circuit in a second mode of operation in which said entertainment system is active.

14. The vehicular telecommunications system of claim 13, wherein said entertainment system comprises an audio entertainment system.

15. The vehicular telecommunications system of claim 14, wherein said audio entertainment system comprises an audio headset over which audio signals are provided.

16. The vehicular telecommunications system of claim 15, wherein said audio headset is an acoustic headset.

17. The vehicular telecommunications system of claim 15, wherein said audio headset is an electroacoustical headset.

18. The vehicular telecommunications system of claim 16, wherein said entertainment system includes a switch configured to detect whether said audio headset is operably coupled to said audio control unit and wherein said entertainment system is configured to enter said second mode of operation responsive to said switch detecting that said audio headset is operably coupled to said audio control unit.

19. The vehicular telecommunications system of claim 17, wherein said entertainment system includes a current monitor configured to detect whether said audio headset is operably coupled to said audio control unit and wherein said entertainment system is configured to enter said second mode of operation responsive to said current monitor detecting that said audio headset is operably coupled to said audio control unit.

20. The vehicular telecommunications system of claim 18, wherein in said second mode of operation, said second call notification circuit provides said call notification via said headset.

21. The vehicular telecommunications system of claim 19, wherein in said second mode of operation, said second call notification circuit provides said call notification via said headset.

22. The vehicular telecommunications system of claim 13, wherein said entertainment system is a video entertainment system.

23. A vehicular telecommunications system comprising:

a telephone configured to receive incoming telephone calls; and an entertainment system operably coupled to said telephone, wherein:

the entertainment system includes a video display device; and notification of incoming telephone calls is provided over the video display device.

* * * * *